US012682210B2

(12) United States Patent
Kuehnert et al.

(10) Patent No.: US 12,682,210 B2
(45) Date of Patent: Jul. 14, 2026

(54) IMPACT FUNCTION GENERATOR FOR GEOSPATIAL CLIMATE HAZARDS

(71) Applicant: INTERNATIONAL BUSINESS MACHINES CORPORATION, Armonk, NY (US)

(72) Inventors: Julian Bertram Kuehnert, Nairobi (KE); Mohamed Akram Zaytar, Nairobi (KE); Anne Jones, Rainford (GB); Blair Nicholas Victor Edwards, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 18/472,614

(22) Filed: Sep. 22, 2023

(65) Prior Publication Data

US 2025/0103852 A1     Mar. 27, 2025

(51) Int. Cl.
*G06N 3/042* (2023.01)
*G06F 40/279* (2020.01)
*G06F 40/40* (2020.01)

(52) U.S. Cl.
CPC ........... *G06N 3/042* (2023.01); *G06F 40/279* (2020.01); *G06F 40/40* (2020.01)

(58) Field of Classification Search
CPC ........ G06N 3/042; G06N 3/045; G06N 5/022; G06F 40/30
See application file for complete search history.

(56) References Cited

U.S. PATENT DOCUMENTS 8,249,886 B2    8/2012  Meyer
8,249,926 B2    8/2012  Avey
(Continued)

FOREIGN PATENT DOCUMENTS

CN        106651211 B      5/2017

OTHER PUBLICATIONS

Aznar-Siguan, et al., "CLIMADA v1: a global weather and climate risk assessment platform." Copernicus Publications, Geoscientific Model Development 12, (2019): pp. 3085-3097.
(Continued)

*Primary Examiner* — Beemnet W Dada
(74) *Attorney, Agent, or Firm* — Kristofer Haggerty

(57)        ABSTRACT
An embodiment for generating impact functions for geospatial climate hazards based on user interactions. The embodiment may receive input data associated with a target geospatial climate hazard and a corresponding asset, the input data including one or more of a first dataset corresponding to a predetermined set of prompts, and a second dataset corresponding to a natural language exchange. The embodiment may generate, based on the first dataset an entity knowledge graph including a series of candidate variables. The embodiment may generate, based on the second dataset, a universal knowledge graph including a series of candidate function formulas. The embodiment may generate, using a graph neural network, embeddings corresponding to the entity knowledge graph and the universal knowledge graph respectively. The embodiment may perform symbolic regression, using the embeddings, to generate one or more impact functions for the target geospatial climate hazard and the corresponding asset.

20 Claims, 4 Drawing Sheets

(56) References Cited

U.S. PATENT DOCUMENTS

| | | | | | |
|---|---|---|---|---|---|
| 11,494,420 | B2 * | 11/2022 | Chen | | G06F 16/322 |
| 2017/0364808 | A1 * | 12/2017 | Fothergill | | G06N 5/00 |
| 2022/0051344 | A1 * | 2/2022 | Dhuvur | | G06Q 50/163 |
| 2023/0076243 | A1 * | 3/2023 | Watt | | G06Q 50/16 |
| 2023/0134933 | A1 * | 5/2023 | Lee | | G06N 3/08 |
| | | | | | 706/45 |
| 2023/0152487 | A1 | 5/2023 | Erinjippurath | | |

OTHER PUBLICATIONS

Climada, "Impact Functions", https://climada-python.readthedocs.io/en/stable/tutorial/climada_entity_ImpactFuncSet.html, Accessed on Sep. 22, 2023, 10 Pages.
De Angeli, et al, "A multi-hazard framework for spatial-temporal impact analysis", ELSEVIER, Feb. 4, 2022, 25 pages.
Hawchar, et al., "A GIS-based framework for high-level climate change risk assessment of critical infrastructure", ELSEVIER, May 7, 2020, 20 Pages.
ECAPRA, "ERN Vulnerability", https://ecapra.org/topics/ern-vulnerability, Accessed on Sep. 22, 2023, 4 Pages.
Oasis, "Oasis Loss Modelling Framework", https://oasisklmf.org/, Accessed on Sep. 22, 2023, 6 Pages.
Jupiter, "The Trusted Leader in Climate Risk Analytics", https://www.jupiterintel.com/, Accessed on Sep. 22, 2023, 13 Pages.
Mignan, et al., "The quantification of low-probability-high-consequences events: part I. A generic multi-risk approach", Nat Hazards (2014) 73:1999-2022, Apr. 18, 2014, 24 pages.
Neumann, et al., "Climate Damage Functions for Estimating the Economic Impacts of Climate Change in the United States", Review of Environmental Economics and Policy, vol. 14, issue 1, Winter 2020, pp. 25-43.
Prahl, et al., "Damage functions for climate-related hazards: unification and uncertainty analysis", Copernicus Publications, Natural Hazards and Earth System Sciences, 2016, pp. 1189-1203.
Souvignet, et al., "Economics of climate adaptation (ECA)—guidebook for practitioners," KfW Development Bank, 2016, 100 Pages.
Vaghefi, et al., "chatClimate: Grounding Conversational AI in Climate Science", arXiv:2304.05510v2 [cs.CL] Apr. 28, 2023, 20 Pages.
Zuzak, et. al., "National Risk Index", FEMA, Nov. 2021, 411 pages. https://www.fema.gov/sites/default/files/documents/fema_national-risk-index_technical-documentation.pdf.

* cited by examiner

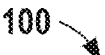

100

COMPUTER 101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

IMPACT FUNCTION GENERATION PROGRAM          150

PERIPHERAL DEVICE SET 114

| UI DEVICE SET 123 | STORAGE 124 | IoT SENSOR SET 125 |

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

| CLOUD ORCHESTRATION MODULE 141 | HOST PHYSICAL MACHINE SET 142 |
| VIRTUAL MACHINE SET 143 | CONTAINER SET 144 |

Figure 1

IMPACT FUNCTION GENERATOR FOR GEOSPATIAL CLIMATE HAZARDS

BACKGROUND

The present application relates generally to computer processing, and more particularly, to generating impact functions for geospatial climate hazards based on user interactions.

As climate hazards have increasingly devastating socio-economic impacts, prediction using climate impact models are key for risk management and disaster preparedness. Impact or damage functions may serve to form a functional relationship between hazard intensity and hazard impact to measure predicted damage to a given asset. Accordingly, many businesses seek to employ and leverage the most adaptable climate impact models capable of generating effective, reliable, and accurate impact or damage functions.

SUMMARY

According to one embodiment, a method, computer system, and computer program product for generating impact functions for geospatial climate hazards based on user interactions is provided. The embodiment may include receiving input data associated with a target geospatial climate hazard and a corresponding asset, the input data including one or more of a first dataset corresponding to a predetermined set of prompts, and a second dataset corresponding to a natural language exchange. The embodiment may also include generating, based on the first dataset an entity knowledge graph including a series of candidate variables related to the target geospatial climate hazard and the corresponding asset. The embodiment may also include generating, based on the second dataset, a universal knowledge edge graph including a series of candidate function formulas that are most associated with the target geospatial climate hazard and the corresponding asset. The embodiment may further include generating, using a graph neural network, embeddings corresponding to the entity knowledge graph and the universal knowledge graph respectively. The embodiment may also include performing symbolic regression, using the embeddings, to generate one or more impact functions for the target geospatial climate hazard and the corresponding asset.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary networked computer environment according to at least one embodiment;

DETAILED DESCRIPTION

Figure 2:
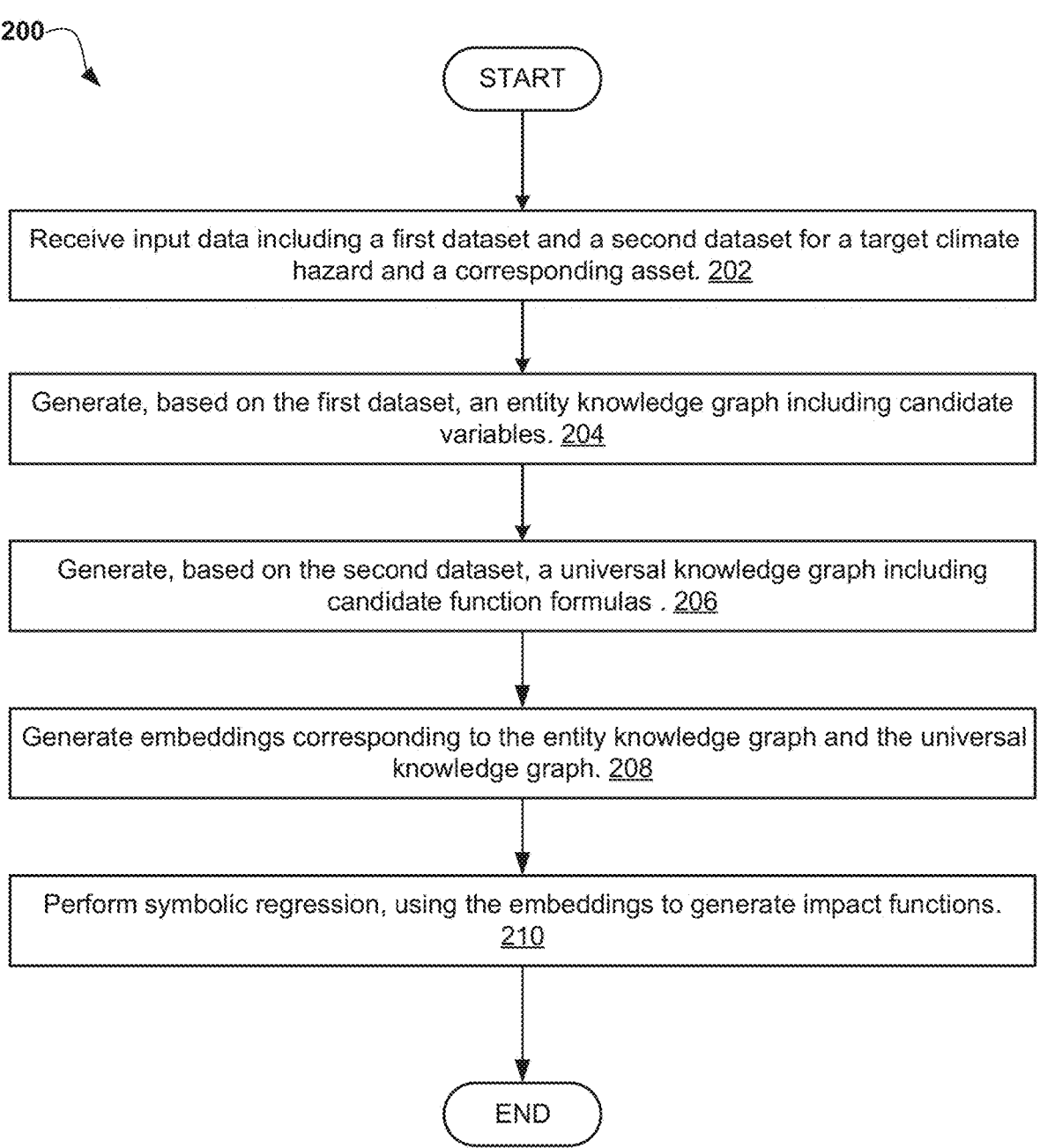
FIG. 2 illustrates an operational flowchart for an exemplary process of generating impact functions for geospatial climate hazards based on user interactions according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate generally to computer processing, and more particularly, to generating impact functions for geospatial climate hazards based on user interactions. The following described exemplary embodiments provide a system, method, and program product to, among other things, receive input data associated with a target geospatial climate hazard and a corresponding asset, the input data including one or more of a first dataset corresponding to a predetermined set of prompts, and a second dataset corresponding to a natural language exchange, generating, based on the first dataset an entity knowledge graph including a series of candidate variables related to the target geospatial climate hazard and the corresponding asset, generate, based on the second dataset, a universal knowledge graph including a series of candidate function formulas that are most associated with the target geospatial climate hazard and the corresponding asset, generate, using a graph neural network, embeddings corresponding to the entity knowledge graph and the universal knowledge graph respectively, and perform symbolic regression, using the embeddings, to generate one or more impact functions for the target geospatial climate hazard and the corresponding asset. Therefore, presently described embodiments have the capacity to improve impact function generation technology by leveraging data gathered from user-interaction to allow for increased adaptability, customization, robustness, and transparency of climate impact models employed to automatically generate impact functions for geospatial climate hazards.

As previously described, as climate hazards have increasingly devastating socio-economic impacts, prediction using climate impact models are key for risk management and disaster preparedness. Impact or damage functions may serve to form a functional relationship between hazard intensity and hazard impact to measure predicted damage to a given asset. Accordingly, many businesses seek to employ and leverage the most adaptable climate impact models capable of generating effective, reliable, and accurate impact or damage functions for a target climate hazard.

However, there are many challenges associated with employing systems to automatically generate effective, reliable, and accurate impact or damage functions for geospatial climate hazards. Typically, impact functions for a target climate hazard are manually determined by domain experts according to observations from historical events, thereby relying significantly on previous observations and human experts in the loop. Additionally, any new or unprecedented climate hazards, or assets of interest, can be associated with gaps in knowledge or data. This may include, for example, hazards with previously unseen severities, specific types of assets which have never been assessed, new geographic contexts or locations, cascading disasters having unknown compounding risks, evolving land use such as spreading or evolving of a given environment, and any other similar unprecedented conditions or situations.

Typical solutions for the above-described problems involve employing platforms which offer end-to-end climate impact modeling. However, known climate impact modeling platforms typically involve several drawbacks. For example, typically employed platforms for climate impact modeling rely on a limited repertoire of parameteric impact functions that may only be calibrated to specific use cases using a few data points form observed ground-truth data. Thus, these platforms rely on users and experience of domain experts to define the impact function or calibrate pre-defined parametric functions. These platforms may also rely on qualitative definitions that can result in bias in evaluations, non-converged results, and resulting incorrect down-stream risk assessments. Furthermore, typically employed platforms for climate impact modeling have a lack of adaptability with respect to specific user interests and the consequential redefinition of functions, workflows, and data inputs that may be involved in adequately and accurate satisfying the user's interests. Additionally, conventional platforms dependencies on models and data are not explicitly encoded in the formulation of the parametric functions, and therefore requirements on the inputs for the computations of these functions are often missing. Lastly, typically employed platforms for climate impact modeling do not leverage geospatial context to transfer experience and knowledge from different geographic regions.

Accordingly, a method, computer system, and computer program product for generating of impact functions for geospatial climate hazards based on user interactions would be advantageous. The method, system, and computer program product may receive input data associated with a target geospatial climate hazard and a corresponding asset, the input data including one or more of a first dataset corresponding to a predetermined set of prompts, and a second dataset corresponding to a natural language exchange. The method, system, computer program product may generate, based on the first dataset an entity knowledge graph including a series of candidate variables related to the target geospatial climate hazard and the corresponding asset. The method, system, computer program product may then generate, based on the second dataset, a universal knowledge graph including a series of candidate function formulas that are most associated with the target geospatial climate hazard and the corresponding asset. The method, system, computer program product may generate, using a graph neural network, embeddings corresponding to the entity knowledge graph and the universal knowledge graph respectively Thereafter, the method, system, computer program product may perform symbolic regression, using the embeddings, to generate one or more impact functions for the target geospatial climate hazard and the corresponding asset. In turn, the method, system, computer program product has provided for improved generating of impact functions for geospatial climate hazards based on user interactions by leveraging a wide breadth of data that includes data received from a user. Described embodiments leverage data including integrated knowledge and observational data, previously modeled data, geospatial context data, and impact formulations from literature to increase the reliability, accuracy, and adaptability of generated climate impact formulas. Described embodiments further provide the ability to generate new model iterations to derive most accurate hazard intensity. Accordingly, presently described embodiments employ methods of generating impact functions for geospatial climate hazards based on user interactions that provide several advantages over conventional modeling platforms such as, for example, increased flexibility towards users interests, robust and transparent risk evaluation, improved efficiency and scalability by automating impact function generation, capability for leveraging fine-grained spatial variability, improved continuous learning by leveraging experience from previous hazard calculations, natural integration of cascading events as described embodiments natively use graphs that can capture linked impact effects, and transferability of skills to different climate hazards and different regions of interest or time periods by leveraging publicly available data.

The present invention may be a system, a method, and/or a computer program product at any possible technical detail level of integration. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as impact function generation program/code 150. In addition to impact function generation code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and impact function generation code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in impact function generation code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in impact function generation program 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the impact function generation program 150 may be a program capable of receiving input data associated with a target geospatial climate hazard and a corresponding asset, the input data comprising one or more of a first dataset corresponding to a predetermined set of prompts, and a second dataset corresponding to a natural language exchange. Impact function generation program 150 may then generate, based on the first dataset an entity knowledge graph including a series of candidate variables related to the target geospatial climate hazard and the corresponding asset. Next, impact function generation program 150 may generate, based on the second dataset, a universal knowledge graph including a series of candidate function formulas that are most associated with the target geospatial climate hazard and the corresponding asset. Impact function generation program 150 may then generate, using a graph neural network, embeddings corresponding to the entity knowledge graph and the universal knowledge graph respectively. Thereafter, impact function generation program 150 may perform symbolic regression, using the embeddings, to generate one or more impact functions for the target geospatial climate hazard and the corresponding asset. In turn, impact function generation program 150 has provided for improved generating of impact functions for geospatial climate hazards based on user interactions by leveraging a wide breadth of data that includes data received from a user. Described embodiments leverage data including integrated knowledge and observational data, previously modeled data, geospatial context data, and impact formulations from literature to increase the reliability, accuracy, and adaptability of generated climate impact formulas. Described embodiments further provide the ability to generate new model iterations to derive most accurate hazard intensity. Accordingly, presently described embodiments employ methods of generating impact functions for geospatial climate hazards based on user interactions that provide several advantages over conventional modeling platforms such as, for example, increased flexibility towards users interests, robust and transparent risk evaluation, improved efficiency and scalability by automating impact function generation, capability for leveraging fine-grained spatial variability, improved continuous learning by leveraging experience from previous hazard calculations, natural integration of cascading events as described embodiments natively use graphs that can capture linked impact effects, and transferability of skills to different climate hazards and different regions of interest or time periods by leveraging publicly available data.

Figure 3:
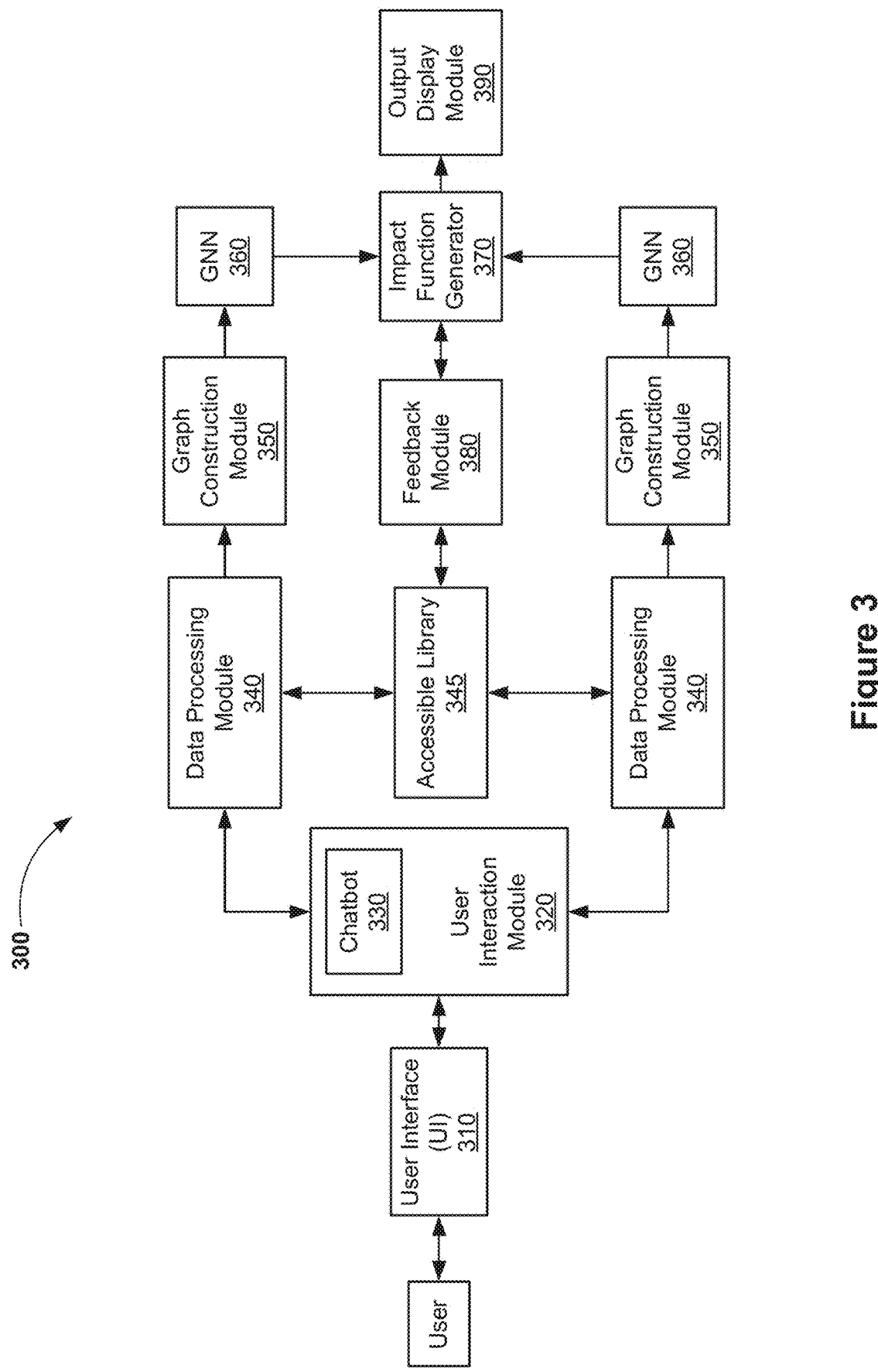
FIG. 3 illustrates exemplary system architecture for generating impact functions for geospatial climate hazards based on user interactions according to at least one embodiment.

Referring now to FIG. 2, an operational flowchart for an illustrative process 200 of generating impact functions for geospatial climate hazards based on user interactions according to at least one embodiment is provided. FIG. 3 will be discussed with reference to FIG. 2.

Specifically, FIG. 3 illustrates exemplary system architecture 300 for generating impact functions for geospatial climate hazards based on user interactions according to at least one embodiment. System architecture 300 may include a user interface 310, a user interaction module 320 including a chatbot 330 for gathering and receiving input data, data processing modules 340 for processing the received input data and leveraging an accessible library 345 to identify most relevant candidate variables and candidate function formulas usable for impact function generation, graph construction modules 350 for converting the processed data into knowledge graphs, graph neural networks (GNNs) 360 for generating embeddings corresponding to the graphs, and an impact function generator 370 for performing symbolic regression on the generated embeddings to generator impact functions for a target geospatial climate hazard and a corresponding asset. FIG. 3 may also include a feedback module 380 configured to gather and store feedback data within accessible library 345, and an output display module 390 configured to output the generated impact functions for the target geospatial climate hazard and the corresponding asset to a user via user interface 310.

Returning to FIG. 2 and illustrative process 200, at step 202, impact function generation program 150 may receive input data associated with a target geospatial climate hazard and a corresponding asset, the input data comprising one or more of a first dataset corresponding to a predetermined set of prompts, and a second dataset corresponding to a natural language exchange. For example, in embodiments, as shown in FIG. 3, impact function generation program 150 may be configured to leverage an exemplary user interaction module 320 including a chatbot 330 to prompt a user to provide input data via a suitable user interface 310. In embodiments, user interaction module 320 may be configured to receive input data corresponding to a first dataset and a second dataset. In other embodiments, user interaction module 320 may be configured to receive only the first or the second dataset.

In embodiments, to receive the input data corresponding to the first dataset, exemplary user interaction module 320 of impact function generation program 150 may be configured to prompt the user with a predetermined set of questions, such as, for example, multiple choice questions, to gather desired information and data related to a target geospatial climate hazard and a corresponding asset of interest. For example, exemplary user interaction module 320 of impact function generation program 150 may be configured to prompt a user to input a time and date, a hazard type, an asset type (building type, vehicle type, or any other suitable asset type), a time horizon to consider, and any other suitable datapoints that may be useful in predicting the impact of the target geospatial climate hazard on the target asset.

In embodiments, to receive the input data corresponding to the second dataset, exemplary user interaction module 320 of impact function generation program 150 may be configured to leverage an exemplary chatbot 330 (see FIG. 3) to conduct a natural language exchange with a user to gather data related to user interests. In embodiments, the conducted natural language exchange may be preconfigured to discuss topics such as, for example, damage types and descriptions, historical precedents, characteristics of the target asset, contextual land use, damage units of interest, infrastructure, structural defenses, and any other suitable topics that may be useful for generating suitable impact functions for the target geospatial climate hazard and the corresponding asset. In embodiments, a data processing module 340 (see FIG. 3) may further process the first and second datasets to extract certain useful properties, keywords, dimensions, tags, or other useful data that may be subsequently leveraged for searching and filtering through historical data as will be described in greater detail below.

Next at 204, impact function generation program 150 may generate, based on the first dataset an entity knowledge graph including a series of candidate variables related to the target geospatial climate hazard and the corresponding asset. At this step, impact function generation program 150 may leverage a graph generation module 350 to generate an entity knowledge graph based on previously collected data products and models, contained in an accessible library 345, which may be used to determine candidate variables or terms which are strongly associated with the target geospatial climate hazard and the corresponding asset. This may be accomplished by extracting properties, dimensions, tags, keywords, and other data gathered from the first dataset using an exemplary data processing module 340 (See FIG. 3) and filtering historical data in accessible library 345 with the extracted properties, dimensions, tags, keywords. For example, extracted properties and keywords identified by data processing module 340 may be used to filter through historical data of observations and computational simulations describing earthquakes and associated impacts. It should be noted that this includes historical data, rather than externally our publicly available data. The historical data may be accessed from an accessible library 345 to identify a series of suitable candidate variables, which may include, for example, 'Magnitude Value', 'Building Height', 'Building Material', 'Geographic building location', and other variables that are strongly associated with the target climate hazard 'TI' associated with an earthquake. In this example, the historical data in accessible library 345 that was leveraged, may have included, for example, historical earthquakes, historical observed damages, historical earthquake simulation data, and any other relevant historical data related to earthquakes. In other words, the first dataset provides 'keywords' to search and filter accessible library 345 which includes insights and data from both historical observations and computational simulations describing hazard types and impacts. The filtered data and models may then be linked in an entity knowledge graph generated by graph construction module 350 of impact function generation program 150 according to the user interest.

At 206, impact function generation program 150 may generate, based on the second dataset, a universal knowledge graph including a series of candidate function formulas that are most associated with the target geospatial climate hazard and the corresponding asset. At this step, the natural language exchange described in step 202 may be leveraged as input for a comprehensive search through accessible library 345 to extract impact function formulations related to the user interest. Information from the extracted formulations may then be included in a universal knowledge graph, linking, for example, nodes of hazard types, asset types and damages via edges of hazard intensity. In embodiments, data processing module 340 of impact function generation program 150 may be configured to access and additionally search any suitable external sources containing relevant and useful impact function formulations. Accordingly, data processing module 340 may be configured to leverage suitable known natural language processing tools and techniques to for example, rewrite conversational queries corresponding to the leveraged natural language exchange from step 202, and perform semantic annotation, parsing, and deep searching sufficient to perform a global literature search of external data contained in the accessible library 345 to extract impact function formulations related to the user's interests, and ultimately, provide input for graph construction module 350 to generate the universal knowledge graph. For example, from an exemplary natural language query of "damage from rainfall triggered mudslide", semantic annotating may parse "rainfall hazard", "mudslide hazard", and "mudslide impact function on infrastructure" for deep search to scan abstracts in any suitable external sources, such as, for example, literature catalogues of scientific publications, and collect most relevant literature containing impact formulations related to these parsed terms which function as target variables. Thus, impact function generation program 150 generates the universal knowledge graph which depicts a series of mined formulas from external sources that provide for impact function formulas that are most relevant to the target geospatial climate hazard and corresponding asset, as well as being strongly correlated to the user's preferences, as the second dataset is derived from the natural language exchange with a user performed in step 202. The generated universal knowledge graph connects the mined formulations (formulas) to correspond to the user's preferences in generating a specific impact function. In other words, for example, if the user is interested in the compound risk of landslide hazards caused by an earthquake in a specific geographical context, the universal knowledge graph will connect landslide impact formulations with earthquake impact formulations.

Next at 208, impact function generation program 150 may generating, using a graph neural network (GNN), embeddings corresponding to the entity knowledge graph and the universal knowledge graph respectively. At this step, impact function generation program 150 may leverage any suitable GNN (see for example GNN 360 in FIG. 3) to generate individual embeddings for both the entity knowledge graph and the universal knowledge graph respectively. In embodiments, impact generation function program 150 may then combine the generated vectors to prepare for subsequent symbolic regression to generate impact functions at step 210, discussed in greater detail below. In some embodiments, to combine the embeddings, impact function generation program 150 may be configured to simply concatenate the two individual vectors. This provides the benefit of involving a simple manipulation with no associated loss of information. In other embodiments, impact function generation program 150 may instead include an attention layer to force compress the vector layer, e.g. to the length of one of the vector embeddings from the GNN. This provides the benefit of lower dimensional input space for the impact function generator and increased explainability. However, it also provides for drawbacks, as utilizing a more complex system typically requires more complex training. In other embodiments, impact function generation program 150 may be configured to further transform the generated embeddings using any desired techniques or algorithms that would facilitate symbolic regression at step 210 described below.

At 210, impact generation program 150 may perform symbolic regression, using the embeddings, to generate one or more impact functions for the target geospatial climate hazard and the corresponding asset. At this step impact generation program 150 leverages an impact function generator 370 (See FIG. 3) to leverage the combined embeddings from step 208 to generate impact functions for the target geospatial climate hazard and the corresponding asset of interest by using symbolic regression. For example, at this step, impact function generator 370 of impact function generation program 150 may utilize symbolic regression to leverage the combined embeddings from step 208 to generate an impact function defined as $y=f(x)$, where 'x' includes one or more multidimensional input variables. Accordingly, the vector embeddings from the GNNs can be multidimensional, separating information related to the damage or impact 'y' from information regarding underlying cause 'x'. Thus, the symbolic regression proposes equations which fit function f, thereby linking different hazard types and scaling their intensities.

In embodiments, generated impact functions for the target geospatial climate hazard and the corresponding asset may be calibrated, tuned or trained either with human-in-the-loop feedback by extending the user-system interaction described at step 202, or with impact observations from historic events, stored in the generated entity knowledge graph. In embodiments, impact function generation program 150 may further include an output display module 390 (as shown in FIG. 3) configured to output the generated impact functions for the target geospatial climate hazard and the corresponding asset to a user via user interface 310. In embodiments, impact function generation program 150 may further include a feedback module 380 (See FIG. 3) configured to gather and store feedback data within accessible library 345. In embodiments, feedback data may be gathered from a user providing feedback via user interface 310 and stored within accessible library 345 to be leveraged in subsequent impact function generation.

Figure 4:
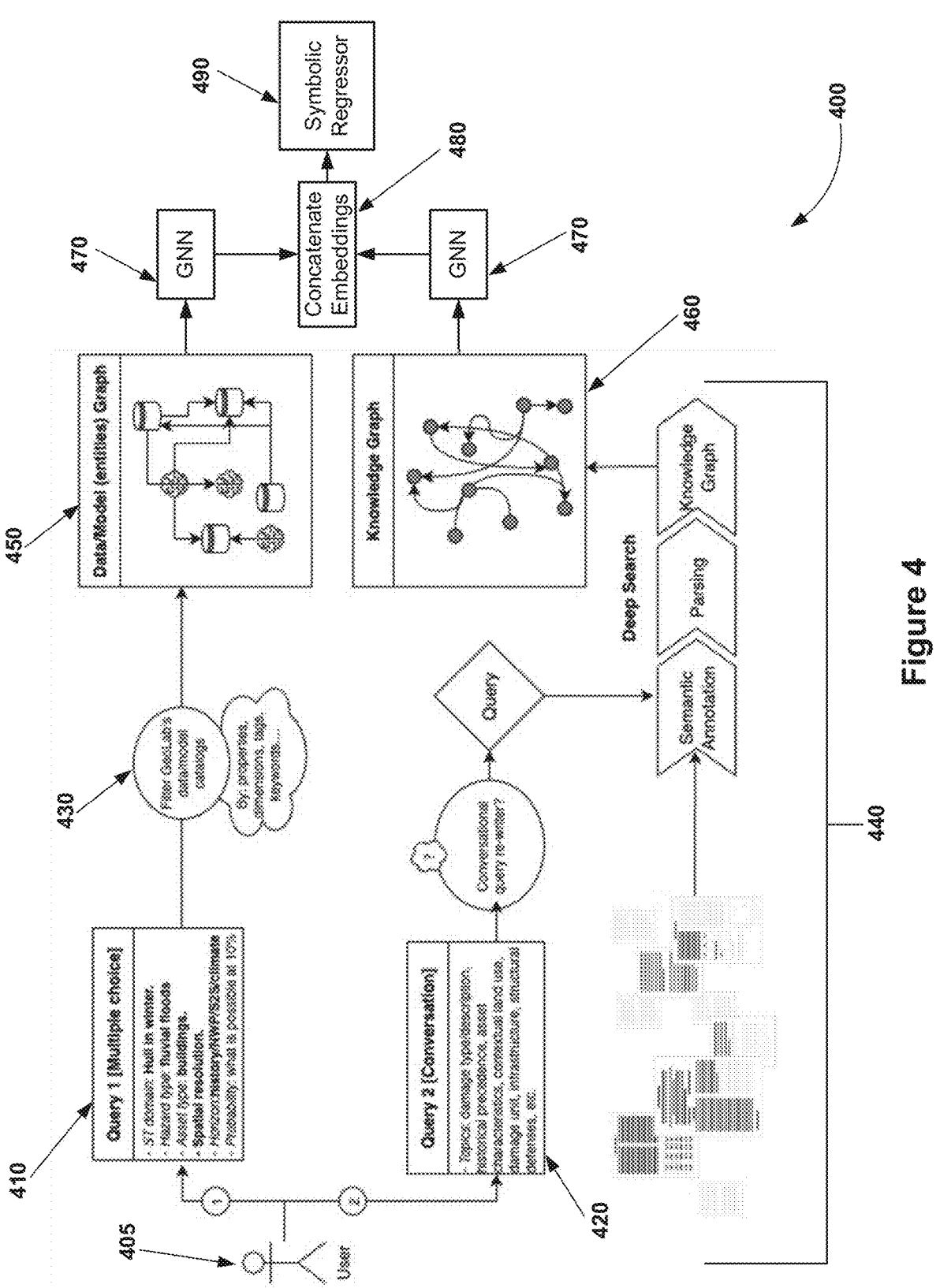
FIG. 4 depicts a diagrammatic view of an exemplary process of generating impact functions for geospatial climate hazards based on user interactions according to at least one embodiment according to at least one embodiment.

FIG. 4 depicts a diagrammatic view of an exemplary process 400 of generating impact functions for geospatial climate hazards based on user interactions. The above-described steps of exemplary process 200 and the system architecture components shown in FIG. 3 are performed and leveraged within exemplary process 400 and are accordingly referenced throughout the description of FIG. 4.

In FIG. 4, impact function generation program 150 receives a first dataset corresponding to a predetermined set of multiple-choice questions 410 at 'Query 1' including data related to a target geospatial climate hazard and corresponding asset that is of interest to an exemplary user 405. Similarly, impact generation function program 150 receives a second dataset corresponding to a natural language exchange 420 at 'Query 2', as was describe above at step 202 of process 200. Then the first dataset is further processed at 430 by an exemplary data processing module of impact function generation program 150 configured to filter through a catalog of historical data and models by properties, dimensions, tags, keywords, and any other useful datapoints to identify most relevant candidate variables related to the target geospatial climate hazard and the corresponding asset of interest. Similarly, at 440, the second dataset is further processed by an exemplary data processing module of impact function generation program 150 configured to leverage natural language processing techniques and tools to rewrite conversational queries corresponding to the leveraged natural language exchange corresponding to second dataset 420, and perform semantic annotation, parsing, and deep searching of a library of literature and historical data to extract relevant impact function formulations related to the second dataset. Then a graph construction module of impact function generation program 150 is leveraged to generate an entity knowledge graph 450 including a series of candidate variables related to the target geospatial climate hazard and the corresponding asset that may be incorporated into an impact function. The graph construction module of impact function generation program 150 is further leveraged to generate a universal knowledge graph 460 including a series of candidate function formulas that are most associated with the target geospatial climate hazard and the corresponding asset, linking nodes of hazard types, asset types and damages via edges of hazard intensity. Then graph neural networks 470 are leveraged to generate embeddings corresponding to entity knowledge graph 450 and universal knowledge graph 460 respectively. These generated embeddings are then combined and concatenated at 480, and further transformed as desired to facilitate the leveraging of a symbolic regressor 490 to leverage the combined embeddings to generate a suitable impact function for the target geospatial climate hazard and the corresponding asset of interest.

It may be appreciated that impact function generation program 150 has thus provided improved generating of impact functions for geospatial climate hazards based on user interactions by leveraging a wide breadth of data that includes data received from a user. Described embodiments leverage data including integrated knowledge and observational data, previously modeled data, geospatial context data, and impact formulations from literature to increase the reliability, accuracy, and adaptability of generated climate impact formulas. Described embodiments further provide the ability to generate new model iterations to derive most accurate hazard intensity. Accordingly, presently described embodiments employ methods of generating impact functions for geospatial climate hazards based on user interactions that provide several advantages over conventional modeling platforms such as, for example, increased flexibility towards users interests, robust and transparent risk evaluation, improved efficiency and scalability by automating impact function generation, capability for leveraging fine-grained spatial variability, improved continuous learning by leveraging experience from previous hazard calculations, natural integration of cascading events as described embodiments natively use graphs that can capture linked impact effects, and transferability of skills to different climate hazards and different regions of interest or time periods by leveraging publicly available data.

It may be appreciated that FIGS. 2-4 provide only illustrations of an exemplary implementation and does not imply any limitations with regard to how different embodiments may be implemented. Many modifications to the depicted environment may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method for generating impact functions for geospatial climate hazards based on user interactions, the method comprising:

receiving input data associated with a target geospatial climate hazard and a corresponding asset, the input data comprising one or more of a first dataset corresponding to a predetermined set of prompts, and a second dataset corresponding to a natural language exchange;

generating, based on the first dataset an entity knowledge graph including a series of candidate variables related to the target geospatial climate hazard and the corresponding asset;

generating, based on the second dataset, a universal knowledge graph including a series of candidate function formulas that are most associated with the target geospatial climate hazard and the corresponding asset;

generating, using a graph neural network, embeddings corresponding to the entity knowledge graph and the universal knowledge graph respectively; and performing symbolic regression, using the embeddings, to generate one or more impact functions for the target geospatial climate hazard and the corresponding asset.

2. The computer-based method of claim 1, further comprising:

extracting, from the first dataset, one or more of properties, dimensions, tags, and keywords.

3. The computer-based method of claim 2, further comprising:

filtering historical data from an accessible library based on the extracted properties, dimensions, tags, and keywords to identify the series of candidate variables related to the target geospatial climate hazard and the corresponding asset.

4. The computer-based method of claim 1, further comprising:

leveraging natural language processing techniques to characterize features of the natural language exchange; and extracting, from accessible external data and publicly available data, relevant impact function formulations associated with the second dataset based on the characterized features of the natural language exchange.

5. The computer-based method of claim 1, wherein the predetermined set of prompts comprises multiple-choice questions.

6. The computer-based method of claim 3, wherein the filtered historical data from the accessible library comprises historical observation data and computational simulations.

7. The computer-based method of claim 1, wherein generating, using the graph neural network, the embeddings corresponding to the entity knowledge graph and the universal knowledge graph respectively further comprises:

concatenating the generated embeddings to generate a combined embedding.

8. A computer system, the computer system comprising:

one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

receiving input data associated with a target geospatial climate hazard and a corresponding asset, the input data comprising one or more of a first dataset corresponding to a predetermined set of prompts, and a second dataset corresponding to a natural language exchange;

generating, based on the first dataset an entity knowledge graph including a series of candidate variables related to the target geospatial climate hazard and the corresponding asset;

generating, based on the second dataset, a universal knowledge graph including a series of candidate function formulas that are most associated with the target geospatial climate hazard and the corresponding asset;

generating, using a graph neural network, embeddings corresponding to the entity knowledge graph and the universal knowledge graph respectively; and performing symbolic regression, using the embeddings, to generate one or more impact functions for the target geospatial climate hazard and the corresponding asset.

9. The computer system of claim 8, further comprising: extracting, from the first dataset, one or more of properties, dimensions, tags, and keywords.

10. The computer system of claim 9, further comprising: filtering historical data from an accessible library based on the extracted properties, dimensions, tags, and keywords to identify the series of candidate variables related to the target geospatial climate hazard and the corresponding asset.

11. The computer system of claim 8, further comprising: leveraging natural language processing techniques to characterize features of the natural language exchange; and extracting, from accessible external data and publicly available data, relevant impact function formulations associated with the second dataset based on the characterized features of the natural language exchange.

12. The computer system of claim 8, wherein the predetermined set of prompts comprises multiple-choice questions.

13. The computer system of claim 10, wherein the filtered historical data from the accessible library comprises historical observation data and computational simulations.

14. The computer system of claim 8, wherein generating, using the graph neural network, the embeddings corresponding to the entity knowledge graph and the universal knowledge graph respectively further comprises:

concatenating the generated embeddings to generate a combined embedding.

15. A computer program product, the computer program product comprising:

one or more computer-readable tangible storage medium and program instructions stored on at least one of the one or more computer-readable tangible storage medium, the program instructions executable by a processor capable of performing a method, the method comprising:

receiving input data associated with a target geospatial climate hazard and a corresponding asset, the input data comprising one or more of a first dataset corresponding to a predetermined set of prompts, and a second dataset corresponding to a natural language exchange;

generating, based on the first dataset an entity knowledge graph including a series of candidate variables related to the target geospatial climate hazard and the corresponding asset;

generating, based on the second dataset, a universal knowledge graph including a series of candidate function formulas that are most associated with the target geospatial climate hazard and the corresponding asset;

generating, using a graph neural network, embeddings corresponding to the entity knowledge graph and the universal knowledge graph respectively; and performing symbolic regression, using the embeddings, to generate one or more impact functions for the target geospatial climate hazard and the corresponding asset.

16. The computer program product of claim 15, further comprising:

extracting, from the first dataset, one or more of properties, dimensions, tags, and keywords.

17. The computer program product of claim 16, further comprising:

filtering historical data from an accessible library based on the extracted properties, dimensions, tags, and keywords to identify the series of candidate variables related to the target geospatial climate hazard and the corresponding asset.

18. The computer program product of claim 15, further comprising:

leveraging natural language processing techniques to characterize features of the natural language exchange; and extracting, from accessible external data and publicly available data, relevant impact function formulations associated with the second dataset based on the characterized features of the natural language exchange.

19. The computer program product of claim 15, wherein the predetermined set of prompts comprises multiple-choice questions.

20. The computer program product of claim 17, wherein the filtered historical data from the accessible library comprises historical observation data and computational simulations.

\* \* \* \* \*